(12) United States Patent  
Puri et al.

(10) Patent No.: US 9,189,850 B1  
(45) Date of Patent: Nov. 17, 2015

(54) EGOMOTION ESTIMATION OF AN IMAGING DEVICE

(71) Applicant: Rawles LLC, Wilmington, DE (US)

(72) Inventors: Manika Puri, Santa Clara, CA (US); Sowmya Gopalan, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 180 days.

(21) Appl. No.: 13/753,395

(22) Filed: Jan. 29, 2013

(51) Int. Cl.
 G06T 7/20 (2006.01)
 G06T 7/00 (2006.01)

(52) U.S. Cl.
 CPC ............ *G06T 7/0018* (2013.01); *G06T 7/2033* (2013.01)

(58) Field of Classification Search
 None
 See application file for complete search history.

(56) References Cited

U.S. PATENT DOCUMENTS

| | | | | |
|---|---|---|---|---|
| 4,969,036 | A * | 11/1990 | Bhanu et al. | 348/113 |
| 6,754,370 | B1 * | 6/2004 | Hall-Holt et al. | 382/106 |
| 7,418,392 | B1 | 8/2008 | Mozer et al. | |
| 7,720,683 | B1 | 5/2010 | Vermeulen et al. | |
| 7,774,204 | B2 | 8/2010 | Mozer et al. | |
| 7,925,049 | B2 * | 4/2011 | Zhu et al. | 382/103 |
| 2011/0316980 | A1 * | 12/2011 | Dubbelman et al. | 348/47 |
| 2012/0063638 | A1 * | 3/2012 | Lim et al. | 382/103 |
| 2012/0154604 | A1 * | 6/2012 | Chen et al. | 348/187 |
| 2012/0223885 | A1 | 9/2012 | Perez | |
| 2012/0236119 | A1 * | 9/2012 | Rhee et al. | 348/46 |
| 2012/0274745 | A1 * | 11/2012 | Russell | 348/46 |
| 2012/0281922 | A1 * | 11/2012 | Yamada et al. | 382/201 |
| 2013/0093852 | A1 * | 4/2013 | Ye | 348/46 |

FOREIGN PATENT DOCUMENTS

WO   WO2011088053 A2   7/2011

OTHER PUBLICATIONS

Ratshidaho et al. "ToF Camera Ego-Motion Estimation." Robotics and Mechatronics Conference of South Africa(ROBOMECH), Nov. 26, 2012, pp. 1-6.*

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

*Primary Examiner* — Jon Chang
(74) *Attorney, Agent, or Firm* — Lee & Hayes, PLLC

(57) ABSTRACT

Described herein are techniques and systems to determine movement of an imaging device (egomotion) using an analysis of images captured the by imaging device. The imaging device, while in a first position, may capture a first image of an environment. The image may be a depth map, a still photograph, or other type of image that enables identification of objects, reference features, and/or other characteristics of the environment. The imaging device may then capture a second image from a second position within the environment after the imaging devices moves from the first position to the second position. A comparison of corresponding reference features from the first image and second image may be used to determine translation and rotation of the imaging device.

25 Claims, 9 Drawing Sheets

EGOMOTION ESTIMATION OF AN IMAGING DEVICE

BACKGROUND

Augmented reality allows interaction among users, real-world objects, and virtual or computer-generated objects and information within an environment. The environment may be, for example, a room equipped with computerized projection and imaging systems that enable presentation of images on various objects within the room and facilitate user interaction with the images and/or objects. The augmented reality may range in sophistication from partial augmentation, such as projecting a single image onto a surface and monitoring user interaction with the image, to full augmentation where an entire room is transformed into another reality for the user's senses. The user can interact with the environment in many ways, including through motion, gestures, voice, and so forth.

To enable such augmented reality environments, however, there is a continuing need for improved projection and detection systems. In particular, movement of the projection and detection systems causes unique challenges while detecting inputs within an environment and outputting projections onto surfaces in the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Augmented reality environments allow users to interact with physical and virtual objects in a physical space. Augmented reality environments are formed through systems of resources such as imaging devices (e.g., cameras, etc.), projectors, computing devices with processing and memory capabilities, and so forth. The projectors project images onto the surroundings that define the environment and the cameras monitor and capture user interactions with such images.

Described herein are techniques and systems to determine movement of an imaging device (egomotion) using an analysis of images captured the by imaging device. The imaging device, while in a first position, may capture a first image of an environment. The image may be a depth map, a still photograph, or other type of image that enables identification of objects, reference features, and/or other characteristics of the environment. The imaging device may then capture a second image from a second position within the environment after the imaging devices moves from the first position to the second position, which is referred to herein as egomotion of the imaging device. Egomotion may include movement in any of the six degrees of freedom (DOF), including translation along an x, y, and z axes and rotation along any of three rotation axes $\alpha$, $\beta$, and $\gamma$, sometimes referred to as Euler angles or as roll, pitch, and yaw.

An analysis of the first image and the second image may result in identification of reference features that are assumed to be stationary in the environment (e.g., walls, large objects, etc.). The reference features from one image may be mapped to corresponding reference features of the other image. The change in perspective of the reference features may then be used to determine egomotion of the imaging device. The egomotion may be output as a change in translation and rotation of the imaging device.

In some embodiments, the determined translation and rotation of the imaging device may be used to adjust an image to compensate for movement of the imaging device and thus recreate the image from a perspective of a previous location of the imaging device. Once the image is adjusted, the recreated image may be compared to the pervious image where the imaging device is in the previous location. The comparison may reveal objects in the environment that are in motion, such as hands of a person, which may be moving in the environment to form a gesture that, when captured by the imaging device, enables user interaction with the system.

The techniques and systems described herein may be implemented in a number of ways. Example implementations are provided below with reference to the following figures.

Figure 1:
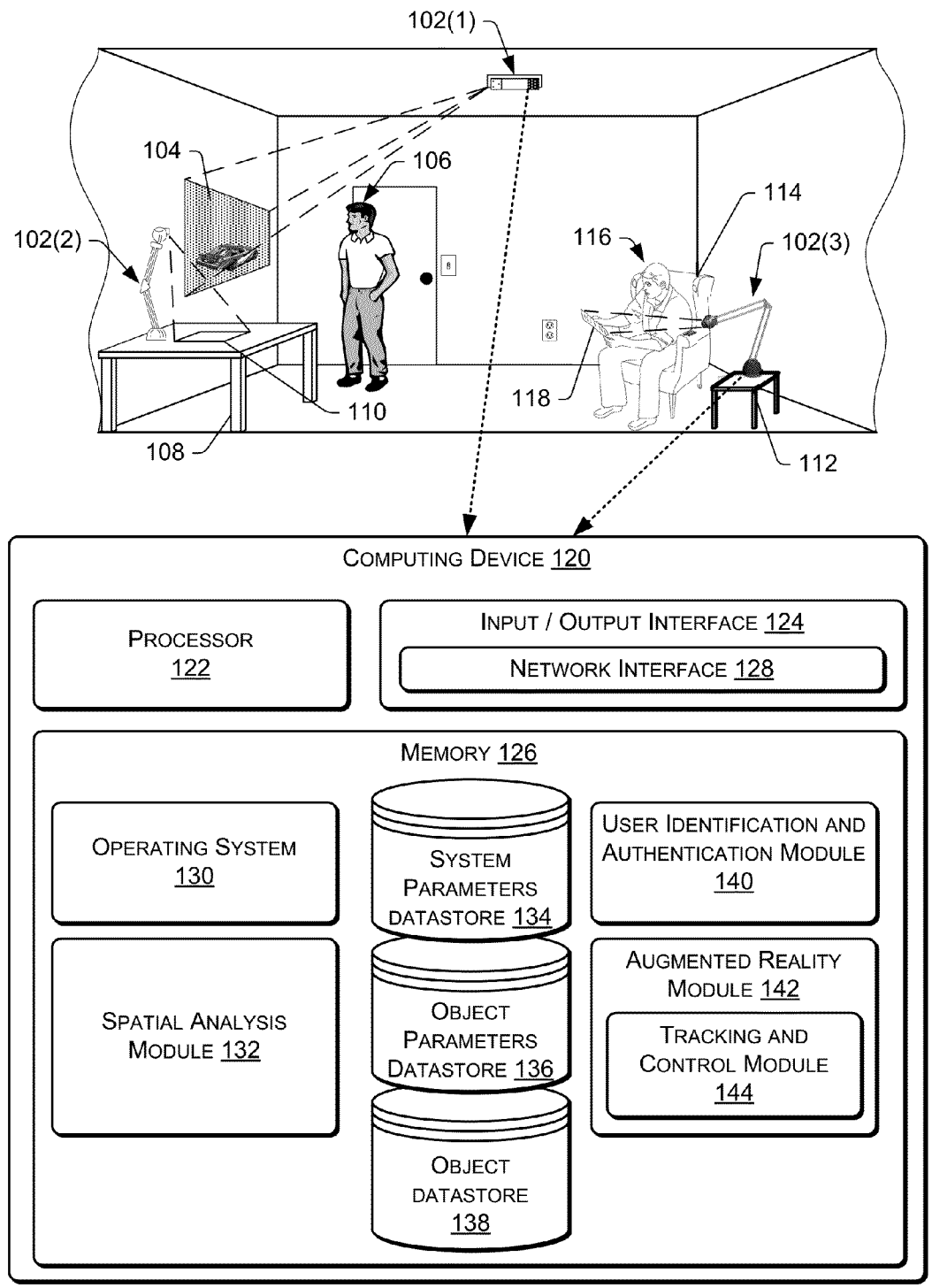
FIG. 1 shows an illustrative scene with an augmented reality environment hosted in an environmental area, such as a room. The augmented reality environment is provided, in part, by three illustrative projection and image capture systems.

FIG. 1 shows an illustrative augmented reality environment 100 created within a scene, and hosted within an environmental area, which in this case is a room. Three illustrative augmented reality functional nodes (ARFN) 102(1)-(3) are shown within the room, however, any number of ARFNs may be used in the augmented reality environment 100. Each ARFN contains projectors, cameras, and computing resources that are used to generate the augmented reality environment 100. In this illustration, the first ARFN 102(1) is a fixed mount system that may be mounted within the room, such as to the ceiling, although other placements are possible. The first ARFN 102(1) projects images onto the scene, such as onto a surface or screen 104 on a wall of the room. A first user 106 may watch and interact with the images being projected onto the wall, and the ceiling-mounted ARFN 102(1) may capture that interaction.

A second ARFN 102(2) is embodied as a table lamp, which is shown sitting on a desk 108. The second ARFN 102(2) projects images 110 onto the surface of the desk 108 for the user 106 to consume and interact. The projected images 110 may be of any number of things, such as homework, video games, news, or recipes.

A third ARFN 102(3) is also embodied as a table lamp, shown sitting on a small table 112 next to a chair 114. A second user 116 is seated in the chair and is holding a portable projection screen 118. The third ARFN 102(3) projects images onto the surface of the portable screen 118 for the user 116 to consume and interact. The projected images may be of any number of things, such as books, games (e.g., crosswords, Sudoku, etc.), news, magazines, movies, browser, etc. The portable screen 118 may be essentially any device for use within an augmented reality environment, and may be provided in several form factors. It may range from an entirely passive, non-electronic, mechanical surface to a full functioning, full processing, electronic device with a projection surface.

These are just sample locations. In other implementations, one or more ARFNs may be placed around the room in any number of arrangements, such as on furniture, on the wall, beneath a table, and so forth.

Associated with each ARFN 102(1)-(3), or with a collection of ARFNs, is a computing device 120, which may be located within the augmented reality environment 100 or disposed at another location external to it. Each ARFN 102 may be connected to the computing device 120 via a wired network, a wireless network, or a combination of the two. The computing device 120 has a processor 122, an input/output interface 124, and a memory 126. The processor 122 may include one or more processors configured to execute instructions. The instructions may be stored in memory 126, or in other memory accessible to the processor 122, such as storage in cloud-based resources.

The input/output interface 124 may be configured to couple the computing device 120 to other components, such as projectors, cameras, microphones, other ARFNs, other computing devices, and so forth. The input/output interface 124 may further include a network interface 128 that facilitates connection to a remote computing system, such as cloud computing resources. The network interface 128 enables access to one or more network types, including wired and wireless networks. More generally, the coupling between the computing device 120 and any components may be via wired technologies (e.g., wires, fiber optic cable, etc.), wireless technologies (e.g., RF, cellular, satellite, Bluetooth, etc.), or other connection technologies.

The memory 126 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the memory 126 and configured to execute on a processor, such as the processor 122. An operating system module 130 is configured to manage hardware and services within and coupled to the computing device 120 for the benefit of other modules.

A spatial analysis module 132 is configured to perform several functions which may include analyzing a scene to generate a topology, recognizing objects in the scene, dimensioning the objects, determining egomotion of an imaging device, and creating a 3D model of the scene. Characterization may be facilitated using several technologies including structured light, light detection and ranging (LIDAR), optical time-of-flight, ultrasonic ranging, stereoscopic imaging, radar, and so forth either alone or in combination with one another. For convenience, and not by way of limitation, some of the examples in this disclosure refer to structured light although other techniques may be used such as time of flight (ToF). The spatial analysis module 132 provides the information used within the augmented reality environment to provide an interface between the physicality of the scene and virtual objects and information.

In accordance with various embodiments, the spatial analysis module 132 may be used to identify reference features within the environment. The reference features may be planar surfaces, edges (lines), or other known shapes or surfaces that can be used as references. The reference features may be compared between sequential images (frames) to enable determination of egomotion of the imaging device, as discussed in detail below. In some instances, the spatial analysis module 132 selects objects for use to create the reference features, where the selected objects are objects that are assumed to be stationary within the environment A system parameters datastore 134 is configured to maintain information about the state of the computing device 120, the input/output devices of the ARFN, and so forth. For example, system parameters may include current pan and tilt settings of the cameras and projectors. The system parameters may also store movement data of the ARFN and/or imaging device as egomotion data. The egomotion data may be calculated in various ways, including by tracking movement and/or operation of motors that cause movement of the ARFN, comparing sequential images (as discussed in greater detail below), from inputs received from a user, from sensor feedback, and so forth. As used in this disclosure, the datastore includes lists, arrays, databases, and other data structures used to provide storage and retrieval of data.

An object parameters datastore 136 in the memory 126 is configured to maintain information about the state of objects within the scene. The object parameters may include the surface contour of the object, overall reflectivity, color, and so forth. This information may be acquired from the ARFN, other input devices, or via manual input and stored within the object parameters datastore 136.

An object datastore 138 is configured to maintain a library of pre-loaded reference objects. This information may include assumptions about the object, dimensions, and so forth. For example, the object datastore 138 may include a reference object of a beverage can and include the assumptions that beverage cans are either held by a user or sit on a surface, and are not present on walls or ceilings. The spatial analysis module 132 may use this data maintained in the datastore 138 to test dimensional assumptions when determining the dimensions of objects within the scene. In some implementations, the object parameters in the object parameters datastore 136 may be incorporated into the object datastore 138. For example, objects in the scene which are temporally persistent, such as walls, a particular table, particular users, and so forth may be stored within the object datastore 138. The object datastore 138 may be stored on one or more of the memory of the ARFN, storage devices accessible on the local network, or cloud storage accessible via a wide area network.

A user identification and authentication module 140 is stored in memory 126 and executed on the processor(s) 122 to use one or more techniques to verify users within the environment 100. In one implementation, the ARFN 102 may capture an image of the user's face and the spatial analysis module 132 reconstructs 3D representations of the user's face. Rather than 3D representations, other biometric profiles may be computed, such as a face profile that includes key biometric parameters such as distance between eyes, location of nose relative to eyes, etc. In such profiles, less data is used than full reconstructed 3D images. The user identification and authentication module 140 can then match the reconstructed images (or other biometric parameters) against a database of images (or parameters), which may be stored locally or remotely on a storage system or in the cloud, for purposes of authenticating the user. If a match is detected, the user is permitted to interact with the system.

An augmented reality module 142 is configured to generate augmented reality output in concert with the physical environment. The augmented reality module 142 may employ essentially any surface, object, or device within the environment 100 to interact with the users. The augmented reality module 142 may be used to track items within the environment that were previously identified by the spatial analysis module 132. The augmented reality module 142 includes a tracking and control module 144 configured to track one or more items within the scene and accept inputs from or relating to the items.

The ARFNs 102 and computing components of device 120 that have been described thus far may be operated to create an augmented reality environment in which images are projected onto various surfaces and items in the room, and the users 106 and 116 may interact with the images. The users' movements, voice commands, and other interactions are captured by the ARFNs 102 to facilitate user input to the environment.

Figure 2:
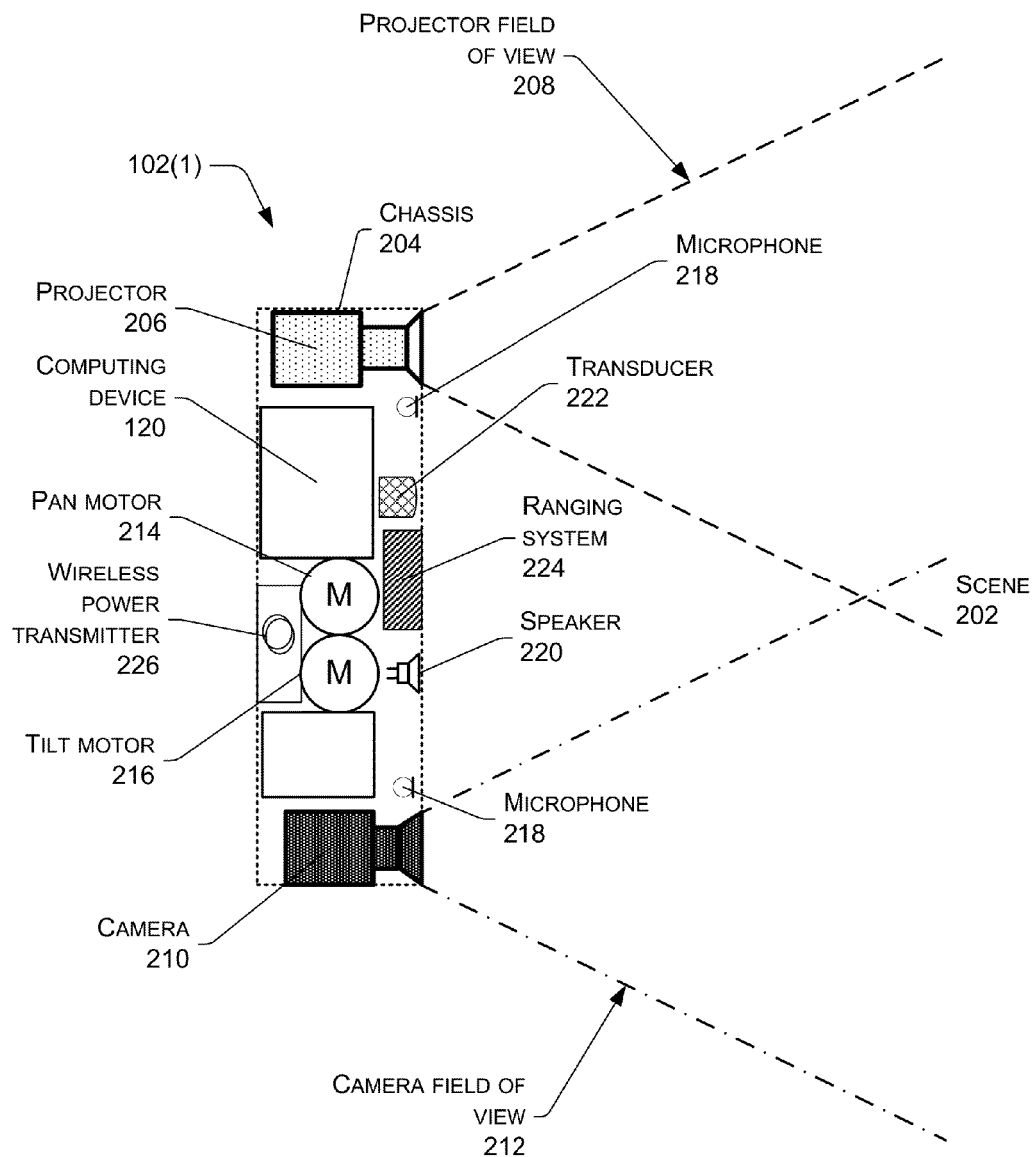
FIG. 2 shows an illustrative projection and image capturing system formed as an augmented reality functional node (ARFN) having a chassis to hold a projector and camera in spaced relation to one another.

FIG. 2 shows an illustrative schematic 200 of one of the ARFNs 102, such as the first augmented reality functional node 102(1) and selected components. The first ARFN 102(1) is configured to scan at least a portion of a scene 202 and the objects therein. The ARFN 102(1) may also be configured to provide augmented reality output, such as images, sounds, and so forth.

A chassis 204 holds the components of the ARFN 102(1). Within the chassis 204 may be disposed a projector 206 that generates and projects images into the scene 202. These images may be visible light images perceptible to the user, visible light images imperceptible to the user, images with non-visible light, or a combination thereof. This projector 206 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 206 has a projector field of view 208 which describes a particular solid angle. The projector field of view 208 may vary according to changes in the configuration of the projector. For example, the projector field of view 208 may narrow upon application of an optical zoom to the projector. In some implementations, a plurality of projectors 206 may be used. Further, in some implementations, the projector 206 may be further configured to project patterns, such as non-visible infrared patterns, that can be detected by camera(s) and used for 3D reconstruction and modeling of the environment. The projector 206 may comprise a microlaser projector, a digital light projector (DLP), cathode ray tube (CRT) projector, liquid crystal display (LCD) projector, light emitting diode (LED) projector or the like.

A camera 210 (or other type of imaging device) may also be disposed within the chassis 204. The camera 210 is configured to image the scene in visible light wavelengths, non-visible light wavelengths, or both. The camera 210 may be implemented in several ways. In some instances, the camera may be embodied a red-green-blue (RGB) camera. In other instances, the camera may include ToF sensors. In still other instances, the camera 210 may be an RGBZ camera that includes both ToF and RGB sensors. The camera 210 has a camera field of view 212 which describes a particular solid angle. The camera field of view 212 may vary according to changes in the configuration of the camera 210. For example, an optical zoom of the camera may narrow the camera field of view 212. In some implementations, a plurality of cameras 210 may be used.

The chassis 204 may be mounted with a fixed orientation, or be coupled via an actuator to a fixture such that the chassis 204 may move. Actuators may include piezoelectric actuators, motors, linear actuators, and other devices configured to displace or move the chassis 204 or components therein such as the projector 206 and/or the camera 210. For example, in one implementation, the actuator may comprise a pan motor 214, tilt motor 216, and so forth. The pan motor 214 is configured to rotate the chassis 204 in a yawing motion. The tilt motor 216 is configured to change the pitch of the chassis 204. By panning and/or tilting the chassis 204, different views of the scene may be acquired. The spatial analysis module 114 may use the different views to monitor objects within the environment. The movement of the imaging device, which is egomotion, may be caused by the pan motor 214, the tilt motor 216, and/or other motors or movements to the imaging device (e.g., movement caused by a user, etc.).

One or more microphones 218 may be disposed within the chassis 204, or elsewhere within the scene. These microphones 218 may be used to acquire input from the user, for echolocation, location determination of a sound, or to otherwise aid in the characterization of and receipt of input from the scene. For example, the user may make a particular noise, such as a tap on a wall or snap of the fingers, which are pre-designated to initiate an augmented reality function. The user may alternatively use voice commands. Such audio inputs may be located within the scene using time-of-arrival differences among the microphones and used to summon an active zone within the augmented reality environment. Further, the microphones 218 may be used to receive voice input from the user for purposes of identifying and authenticating the user. The voice input may be received and passed to the user identification and authentication module 122 in the computing device 104 for analysis and verification.

One or more speakers 220 may also be present to provide for audible output. For example, the speakers 220 may be used to provide output from a text-to-speech module, to playback pre-recorded audio, etc.

A transducer 222 may be present within the ARFN 102(1), or elsewhere within the environment, and configured to detect and/or generate inaudible signals, such as infrasound or ultrasound. The transducer may also employ visible or non-visible light to facilitate communication. These inaudible signals may be used to provide for signaling between accessory devices and the ARFN 102(1).

A ranging system 224 may also be provided in the ARFN 102 to provide distance information from the ARFN 102 to an object or set of objects. The ranging system 224 may comprise radar, light detection and ranging (LIDAR), ultrasonic ranging, stereoscopic ranging, and so forth. In some implementations, the transducer 222, the microphones 218, the speaker 220, or a combination thereof may be configured to use echolocation or echo-ranging to determine distance and spatial characteristics.

A wireless power transmitter 226 may also be present in the ARFN 102, or elsewhere within the augmented reality environment. The wireless power transmitter 226 is configured to transmit electromagnetic fields suitable for recovery by a wireless power receiver and conversion into electrical power for use by active components in other electronics, such as a non-passive screen 118. The wireless power transmitter 226 may also be configured to transmit visible or non-visible light to communicate power. The wireless power transmitter 226 may utilize inductive coupling, resonant coupling, capacitive coupling, and so forth.

In this illustration, the computing device 120 is shown within the chassis 204. However, in other implementations all or a portion of the computing device 120 may be disposed in another location and coupled to the ARFN 102(1). This coupling may occur via wire, fiber optic cable, wirelessly, or a combination thereof. Furthermore, additional resources external to the ARFN 102(1) may be accessed, such as resources in another ARFN accessible via a local area network, cloud resources accessible via a wide area network connection, or a combination thereof.

In other implementations, the components of the ARFN 102(1) may be distributed in one or more locations within the environment 100. As mentioned above, microphones 218 and speakers 220 may be distributed throughout the scene. The projector 206 and the camera 210 may also be located in separate chassis 204.

Figure 3:
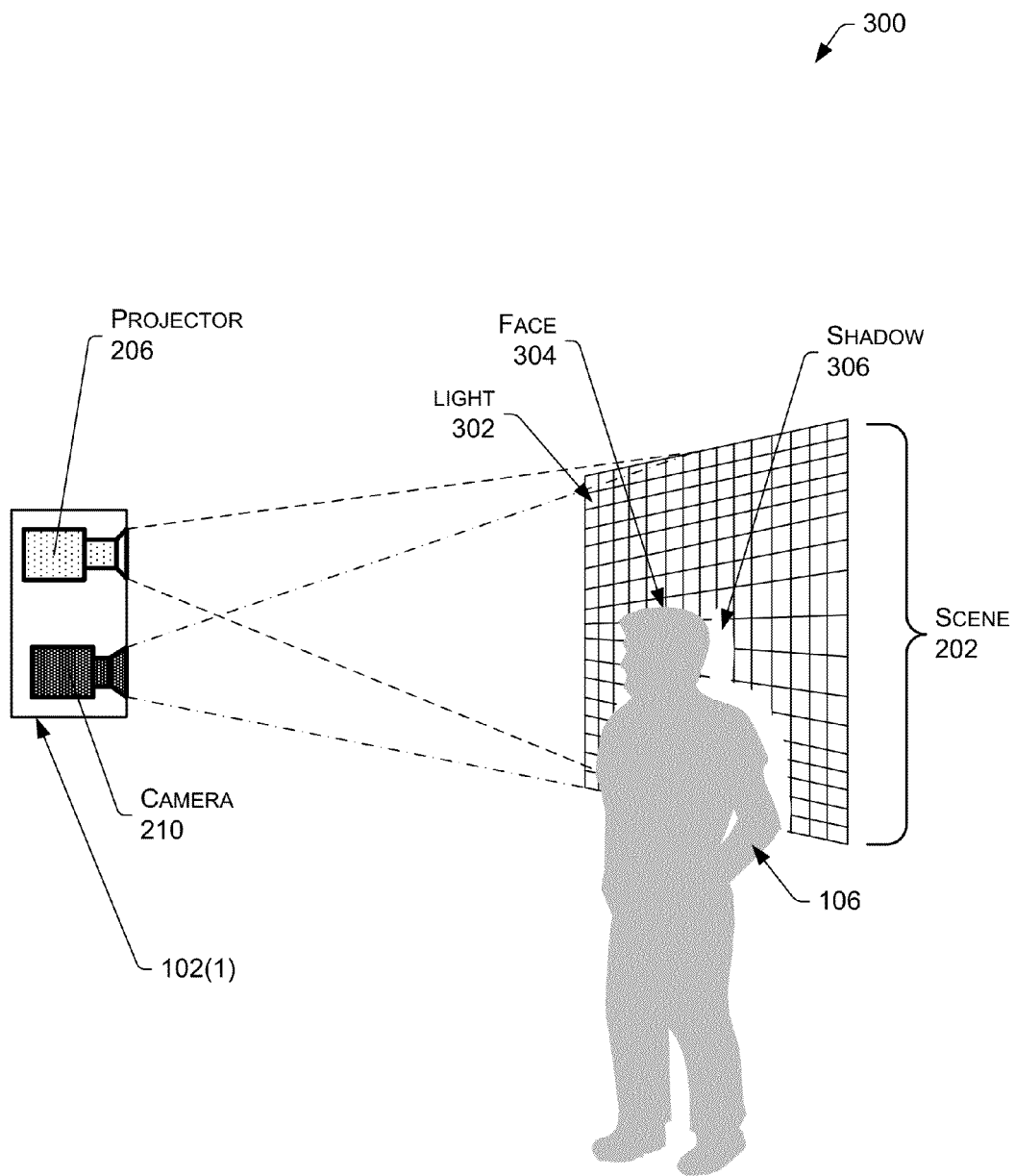
FIG. 3 illustrates example implementations of creating an augmented reality environment by projecting light on a scene and capturing a corresponding image of the scene.

FIG. 3 illustrates one example operation 300 of the ARFN 102(1) of creating an augmented reality environment by light on a scene and capturing a corresponding image of the scene. In some embodiments, the projector 206 within the ARFN 102(1) projects a structured light pattern 302 onto the scene 202. In some implementations, a sequence of different structure light patterns 302 may be used. This structured light pattern 302 may be in wavelengths which are visible to the user, non-visible to the user, or a combination thereof. The structured light pattern 304 is shown as a grid in this example, but not by way of limitation. In other implementations, other patterns may be used, such as bars, dots, pseudorandom noise, and so forth. Pseudorandom noise (PN) patterns are particularly useful because a particular point within the PN pattern may be specifically identified. A PN function is deterministic in that given a specific set of variables, a particular output is defined. This deterministic behavior allows the specific identification and placement of a point or block of pixels within the PN pattern.

The user 106 is shown within the scene 202 such that the user's face 304 is between the projector 206 and a wall. A shadow 306 from the user's body appears on the wall. Further, a deformation effect may be produced on the shape of the user's face 304 as the structured light pattern 302 interacts with the facial features. This deformation effect may be detected by the camera 210, which is further configured to sense or detect the structured light. In some implementations, the camera 210 may also sense or detect wavelengths other than those used for structured light pattern 302.

The images captured by the camera 210 may be used to create a depth map of the environment and/or for any number of things. For instances, some images of the scene are processed by the spatial analysis module 132 to characterize the scene 202. In some implementations, multiple cameras may be used to acquire the image. In other instances, the images of the user's face 304 (or other body contours, such as hand shape) may be processed by the spatial analysis module 132 to reconstruct 3D images of the user, which are then passed to the user identification and authentication module 140 for purposes of verifying the user.

Certain features of objects within the scene 202 may not be readily determined based upon the geometry of the ARFN 102(1), shape of the objects, distance between the ARFN 102(1) and the objects, and so forth. As a result, the spatial analysis module 132 may be configured to make one or more assumptions about the scene, and test those assumptions to constrain the dimensions of the scene 202 and maintain the model of the scene.

In some embodiments, the operation 300 may include creating a depth map for an environment, such as a room, using time of flight (ToF) of light emitted by a light emitter, such as the projector or another source. The light may reflect off surfaces in the environment and then be detected by a light sensor (which may be the same or different than the camera 210). The time of flight of the light may be used to create or determine the depth map of the environment, which may be used by the spatial analysis module 132 to characterize the scene 202. This depth map may be used to detect objects, such as hands of a person, and to track movement of the objects. One application is to track movement of a person's hands to determine gestures, which may then be used as inputs to control actions of the ARFN 102(1), 102(2) and/or 102(3).

In accordance with one or more embodiments, the operation 300 may include use of stereo imaging, which may utilize two or more monocular cameras to generate a stereoscopic image. The stereoscopic image may provide depth information of objects in the environment.

Figure 4:
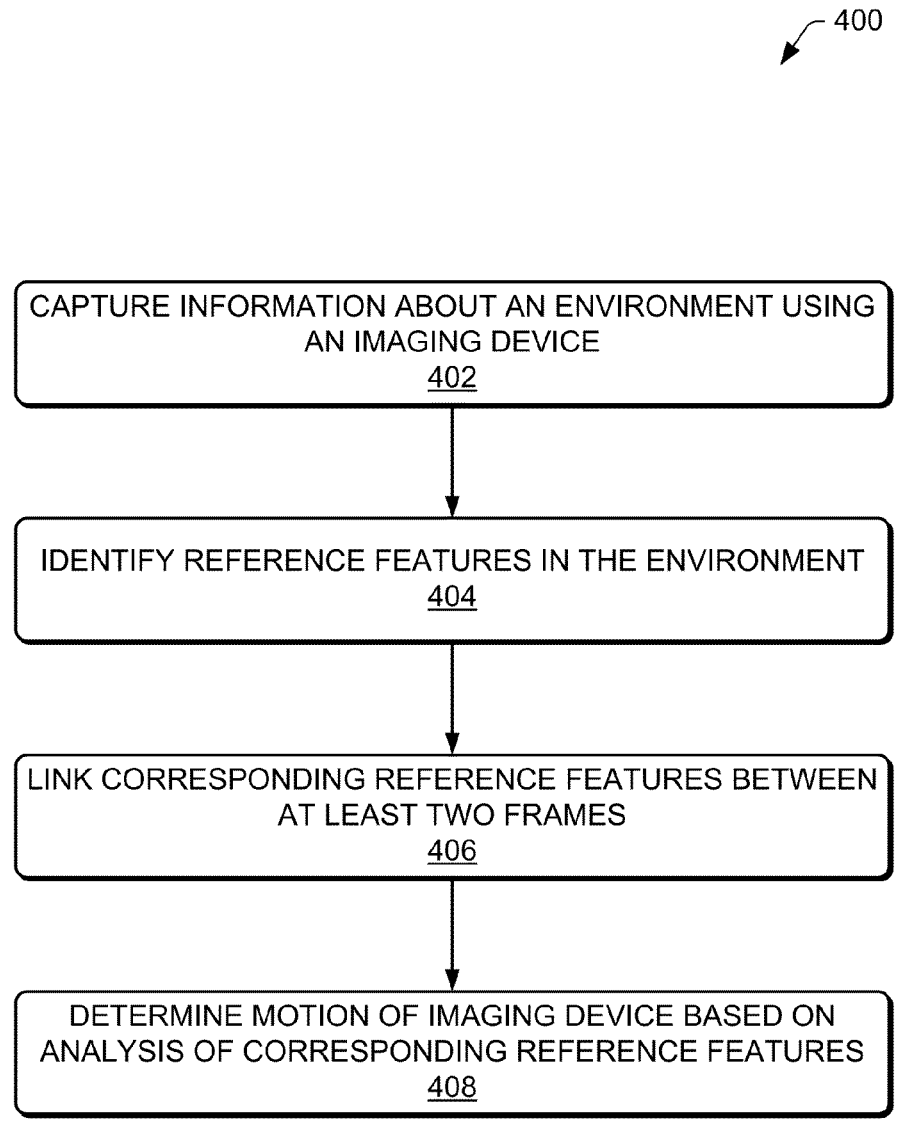
FIG. 4 shows a flow diagram of an illustrative process to determine movement of an imaging device (egomotion) based on an analysis of reference features in at least two frames captured by the imaging device.
Figure 5:
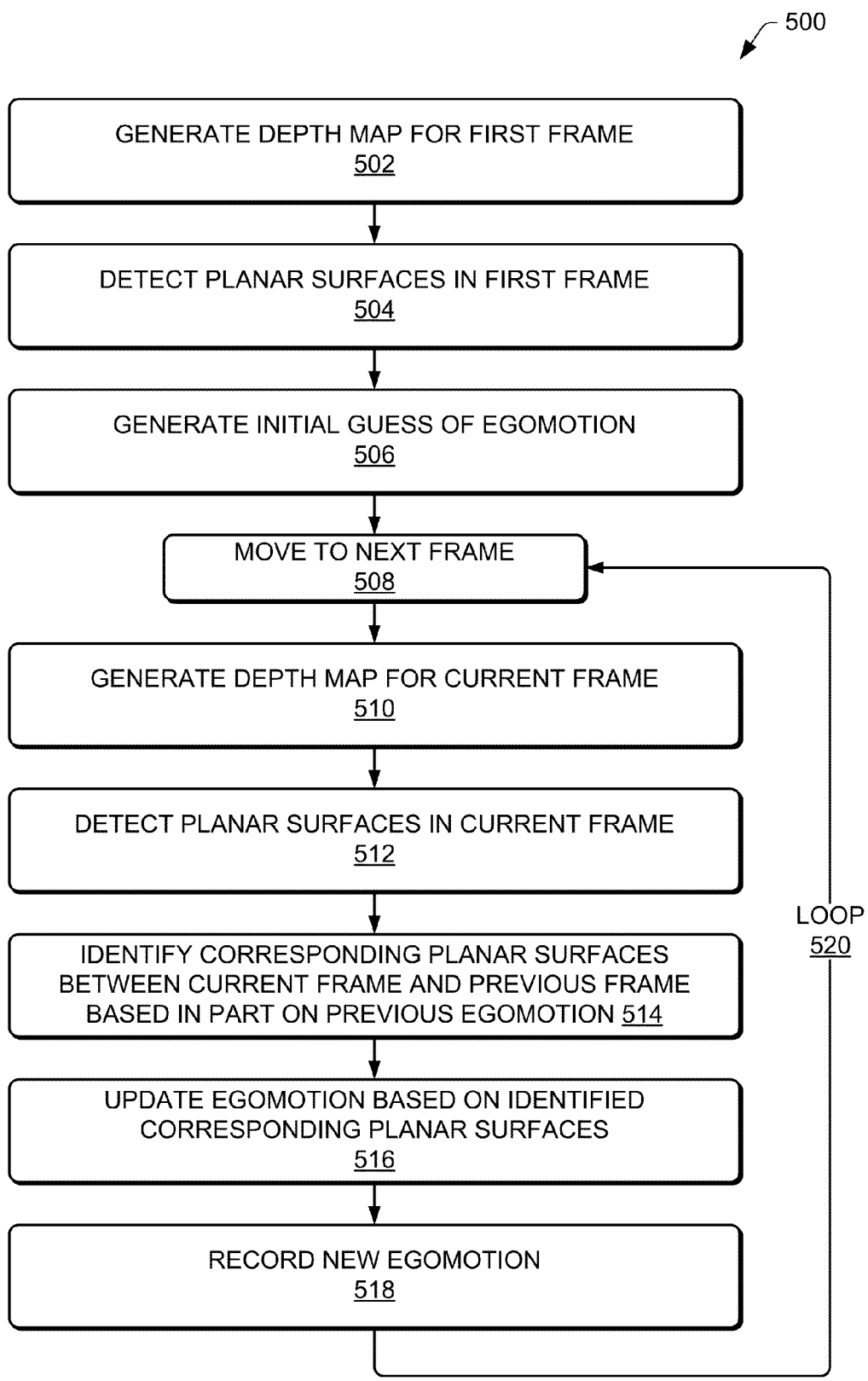
FIG. 5 shows a flow diagram of an illustrative process to determine egomotion based on an analysis of planar surfaces in at least two frames.
Figure 9:
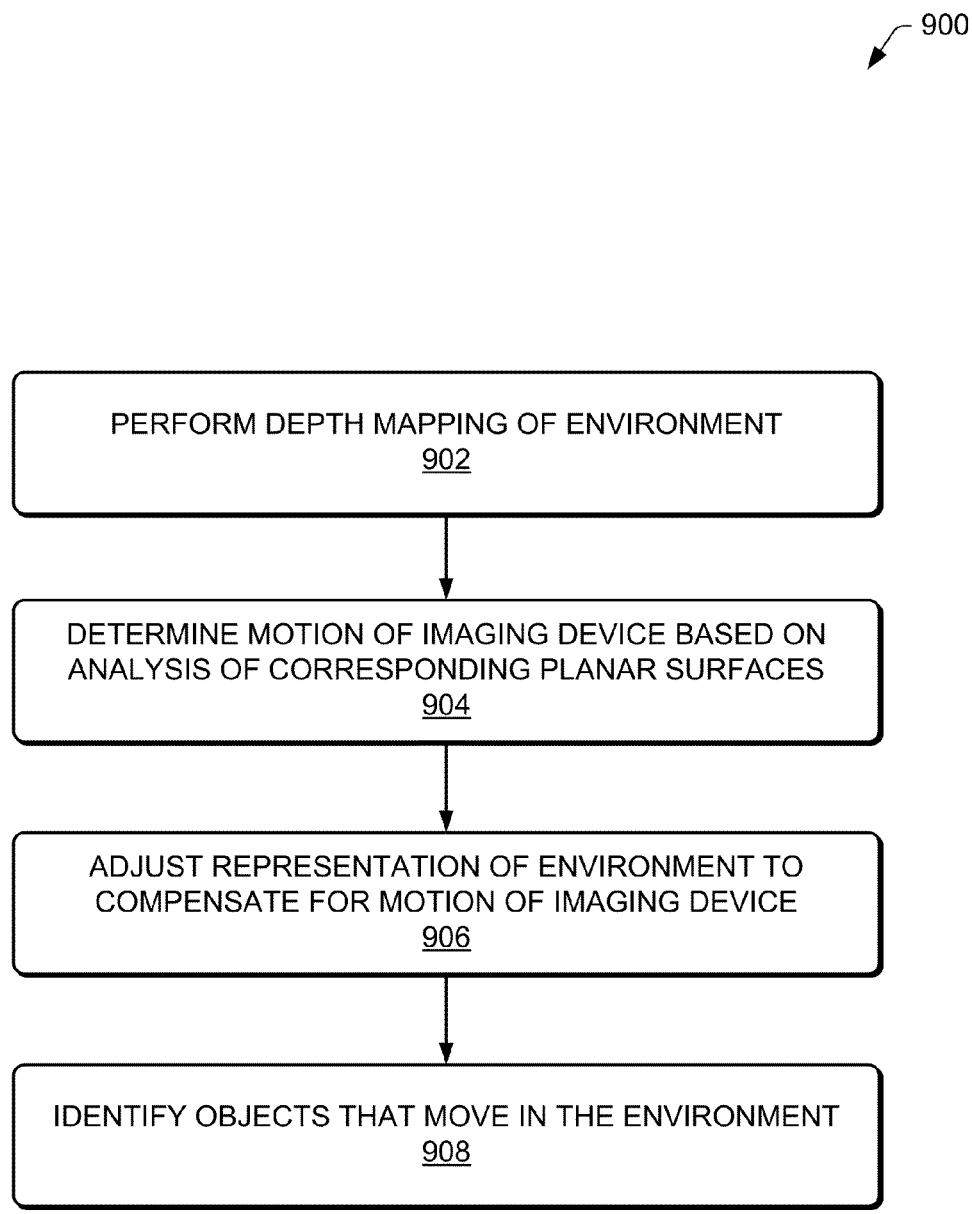
FIG. 9 shows a flow diagram of an illustrative process to identify moving objects within an environment using images captured by the imaging device while the imaging device moves within the environment.

FIGS. 4, 5, and 9 illustrate processes that enable estimation and/or determination of egomotion of an imaging device. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

FIG. 4 shows a flow diagram of an illustrative process 400 to determine movement of an imaging device (egomotion) based on an analysis of reference features in at least two frames captured by the imaging device. The process 400 is described with reference to FIG. 1; however, the process 400 may be implemented with any of the embodiments described herein.

At 402, the imaging device may be used to capture information about an environment, such as a room. The information may be imagery (e.g., a still image, etc.) and/or a depth map. The information may also include other information about the environment.

At 404, the spatial analysis module 132 may identify reference features in the environment using the information captured at the operation 402. The reference features may be planar surfaces, edges (lines), known shapes (e.g., circles, squares, etc.), and/or shapes or segments. For example, a wall and a table may include planar surfaces. A junction between two walls may create a line. A soda can includes a circle (when viewed from above), which may be viewed as an ellipse depending on the perspective of the imaging device.

The reference features are objects (surfaces, etc.) that are assumed to be stationary in the environment. In some embodiments, only certain objects may be used to create reference objects. These objects may be objects that are assumed to be stationary, such as tables, walls, ceilings, floors, and so forth. However, in some instances, some of these objects may be determined to have moved (e.g., a table may be moved, etc.). In such instances, the moving objects may be selectively excluded from being used to create reference features, as least temporarily, while these objects are in motion between two frames used in the following operations. In some embodiments, the reference features may be detected using RANdom Sampling and Consensus (RANSAC)

At 406, the spatial analysis module 132 may link corresponding reference features between at least two successive frames captured using the operation 402. For example, during a second of time, the imaging device may capture eight, sixteen, thirty or any other number of images (frames). A frame may be compared to a successive frame (e.g., a frame immediately before and/or a frame immediately after the frame) using the operation 406.

In some instances, known information about prior movement of the imaging device may be used at the operation 406 to link the corresponding reference features from each frame. As an example, in a first frame, a surface of a table may have a first perspective based on a first position of the imaging device when the first frame was captured. In a second frame, the surface of the table may have a second perspective based on a second position of the imaging device when the second frame was captured. The operation 406 may link the surface from each frame. The known information about prior movement may be a prior egomotion determined by comparing sequential images, tracking movement and/or operation of motors that cause movement of the ARFN, from inputs received from a user, from sensor feedback, and so forth.

At 408, the spatial analysis module 132 may determine motion of the imaging device as the egomotion based at least in part on an analysis of the corresponding reference features. For example, the spatial analysis module 132 may perform an iterative closest point (ICP) analysis to determine egomotion of the imaging device as a translation and rotation between the compared frames. The egomotion of the imaging device may be stored in association with a frame and/or used to translate the frame, as discussed below with reference to FIG. 9, to enable identification of objects that are moving within the environment in addition to the imaging device that is moving within the environment.

FIG. 5 shows a flow diagram of an illustrative process 500 to determine egomotion based on an analysis of planar surfaces in at least two frames. The process 500 is described with reference to FIG. 1; however, the process 500 may be implemented with any of the embodiments described herein.

At 502, the imaging device may generate a depth map as a first frame in a sequence of frames. The depth map may be created using ToF sensors that measure travel of light reflected in the environment, using deformation of structured light, or other techniques that provide a depth map of the environment.

At 504, the spatial analysis module 132 may detect planar surfaces in the first frame. In some embodiments, the planar surfaces may be detected using RANSAC. The planar surfaces may include surfaces of walls, floors, ceilings, tables, and/or other surfaces that include planes. In some instances, planar surfaces may be identified in portions of curved objects. For example, the spatial analysis module 132 may identify a planar surface on a cushion of a couch. In some embodiments, the planar surfaces may be fitted to a planar equation.

At 506, the spatial analysis module 132 may generate an initial guess of an egomotion of the imaging device. The initial guess may be generated based on one or more pieces of previous egomotion information, a command to move the imaging device, tracking movement and/or operation of motors that cause movement of the imaging device, inputs from a user, and/or from sensor feedback (e.g., sensors that directly or indirectly measure movement of the imaging device, etc.).

The operations 502-506 provide a first analysis of a frame, which is compared to another successive frame in the following operations of the process 500. The process 500 may then loop to continue to compare successive frames and determine egomotion associated with each frame. The operations 502-506 may be triggered by an event such as powering-on of the system, a command to move the imaging device, sensor detection of movement of the imaging device, and/or other events.

At 508, the process 500 may advance to a next frame (successive frame), which may be captured by the imaging device at a fixed or variable frame rate.

At 510, the imaging device may generate a depth map for the current frame. In an initial run of the process 500, the current frame may be referred to as the second frame while the first frame may be referred to as the previous frame. However, the frames may be more generally referred to as "frame N" and "frame N+1", where frame N+1 is a successive frame (next frame) after frame N.

At 512, the spatial analysis module 132 may detect planar surfaces (or other reference features) in the second frame. The operations 510 and 512 may be similar or the same as the operations 502 and 504, respectively. As discussed above, the planar surfaces may be fitted to a planar equation.

At 514, the spatial analysis module 132 may identify corresponding planar surfaces (or other reference features) between the current frame (frame N+1) and the previous frame (frame N). The spatial analysis module 132 may identify the corresponding planar surfaces based at least in part on a previous egomotion. In the first run of the process 500, the previous egomotion may be the initial guess of the egomotion generated at the operation 506. However, in subsequent runs of the process 500, after calculation of the egomotion as discussed below, the prior calculated egomotion may be used for the previous egomotion.

At 516, the spatial analysis module 132 may create a new egomotion (or revise a new egomotion when the operation 516 is looped directly back to the operation 514. The egomotion may be based on the identified corresponding planar surfaces from the operation 514. In some embodiments, the spatial analysis module 132 may perform an iterative closest point (ICP) analysis to determine egomotion of the imaging device as a translation and rotation between the compared frames. In various embodiments, the egomotion may be based on a comparison of equations of the corresponding planar surfaces when the planar surfaces are represented by planar equations. However other comparisons may use locations of points or other data captured at the operations 504 and 512 about the planar surfaces. In some embodiments, the operations 502 and 504 may generate data for a frame-of-reference while the operations 510 and 512 may generate data for changes from the frame-of-reference. In this example, the previous frame may be the frame-of-reference. However, some embodiments may use the current or subsequent frame as the frame-of-reference. When the previous frame is the frame-of-reference, then the egomotion data may be associated with the current or subsequent frame.

At 518, the spatial analysis module 132 may record the new egomotion in the system parameters datastore 134 or in another storage location to enable retrieval of the egomotion at a later time (possibly as prior egomotion data for a next run of the process via a loop 520). The egomotion may be stored as translation and rotation data, and may be associated with a particular image or frame captured by the imaging device.

The process 500 may loop following the operation 518, via a loop 520, to the operation 508 to move to the next frame (successive frame). The egomotion recorded at the operation 518 may then be used as the "previous egomotion" for the frame N, while a new frame N+1 may be generated at the operation 510. The process 500 may continue via the loop 520 while the egomotion indicates movement of the imaging device and/or for any other amount of time.

Figure 6:
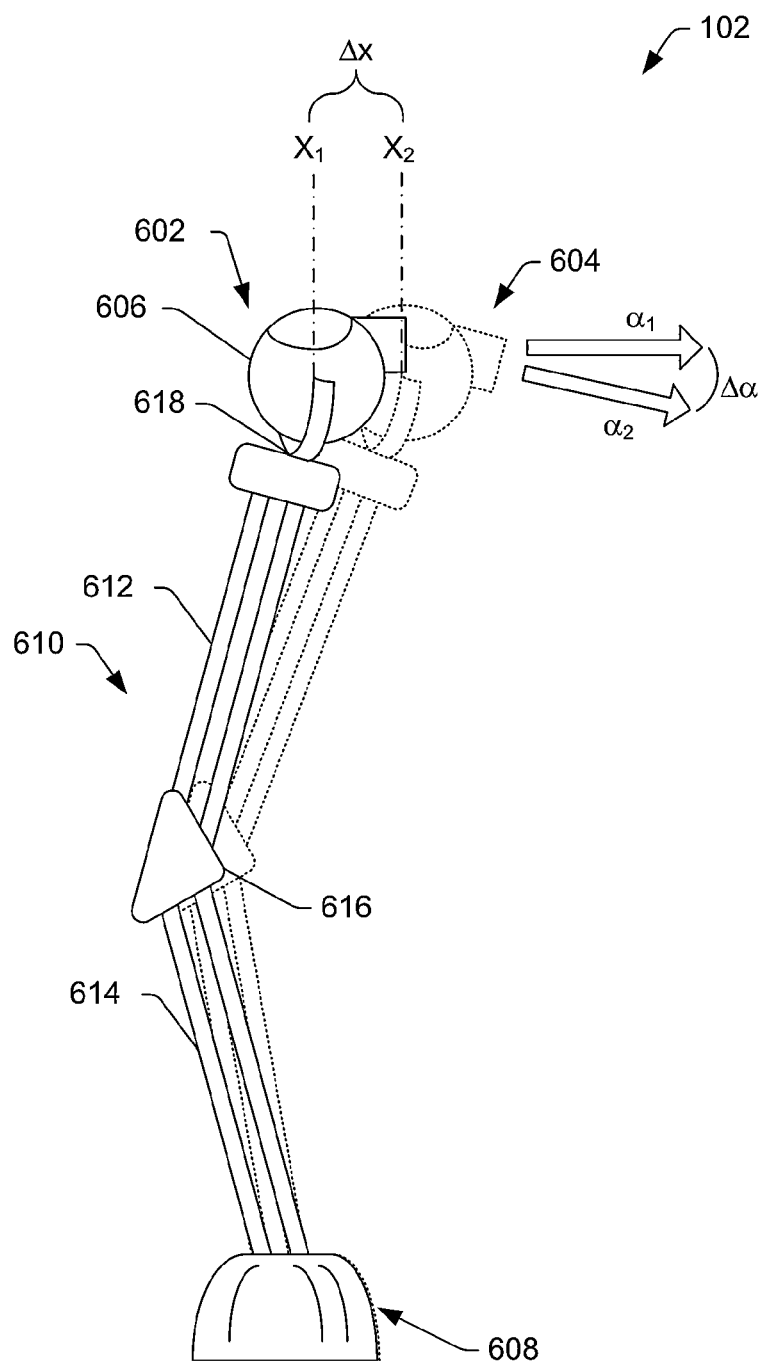
FIG. 6 shows an isometric view of an ARFN that moves from a first location to a second location, the movement causing a change in viewpoint of an imaging device, and thus a change in the perspective of an environment.
Figure 7:
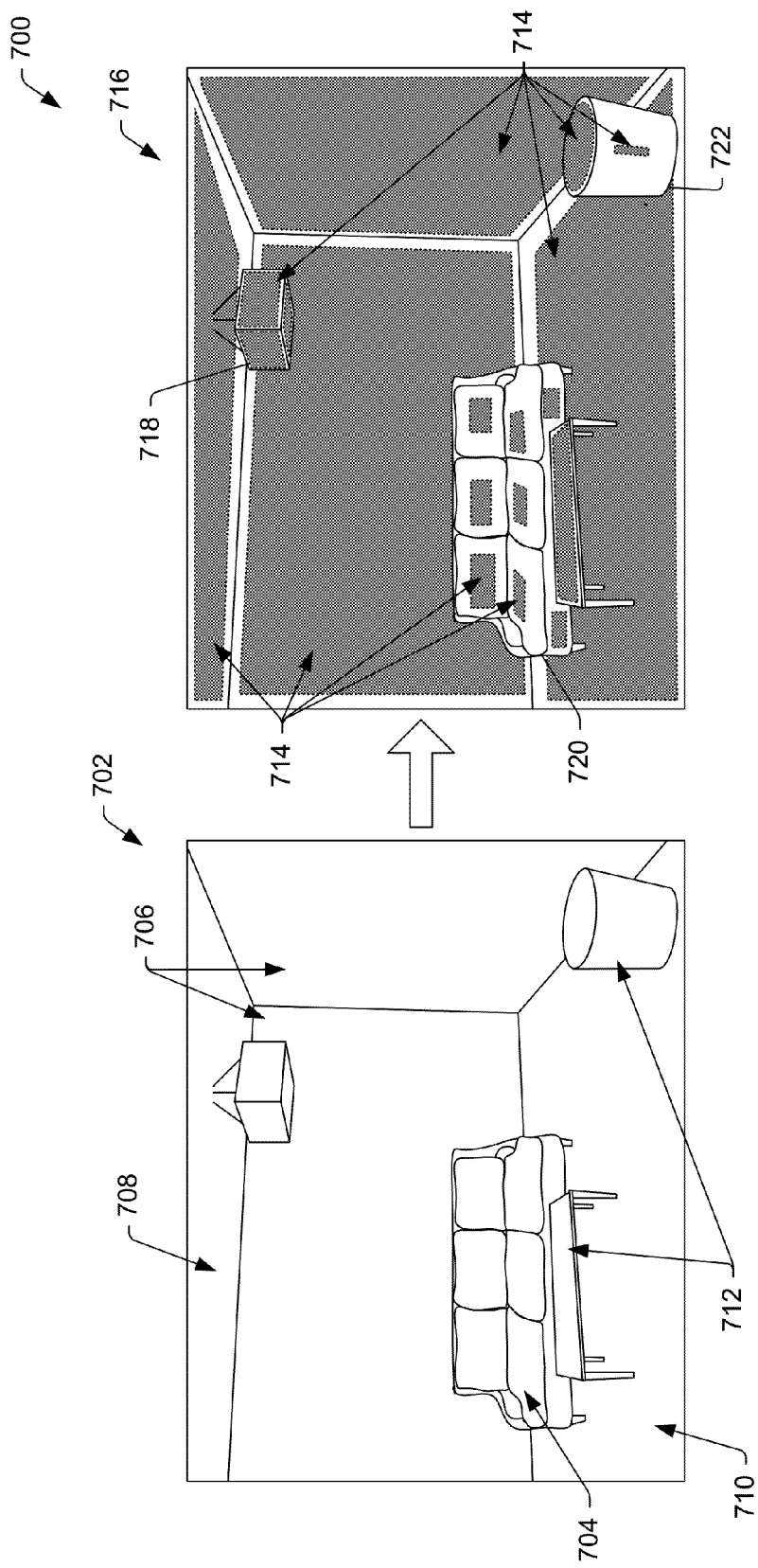
FIG. 7 shows illustrative images of an environment from a perspective of the imaging device. One of the images includes illustrative planar surfaces that may be identified within the environment.
Figure 8:
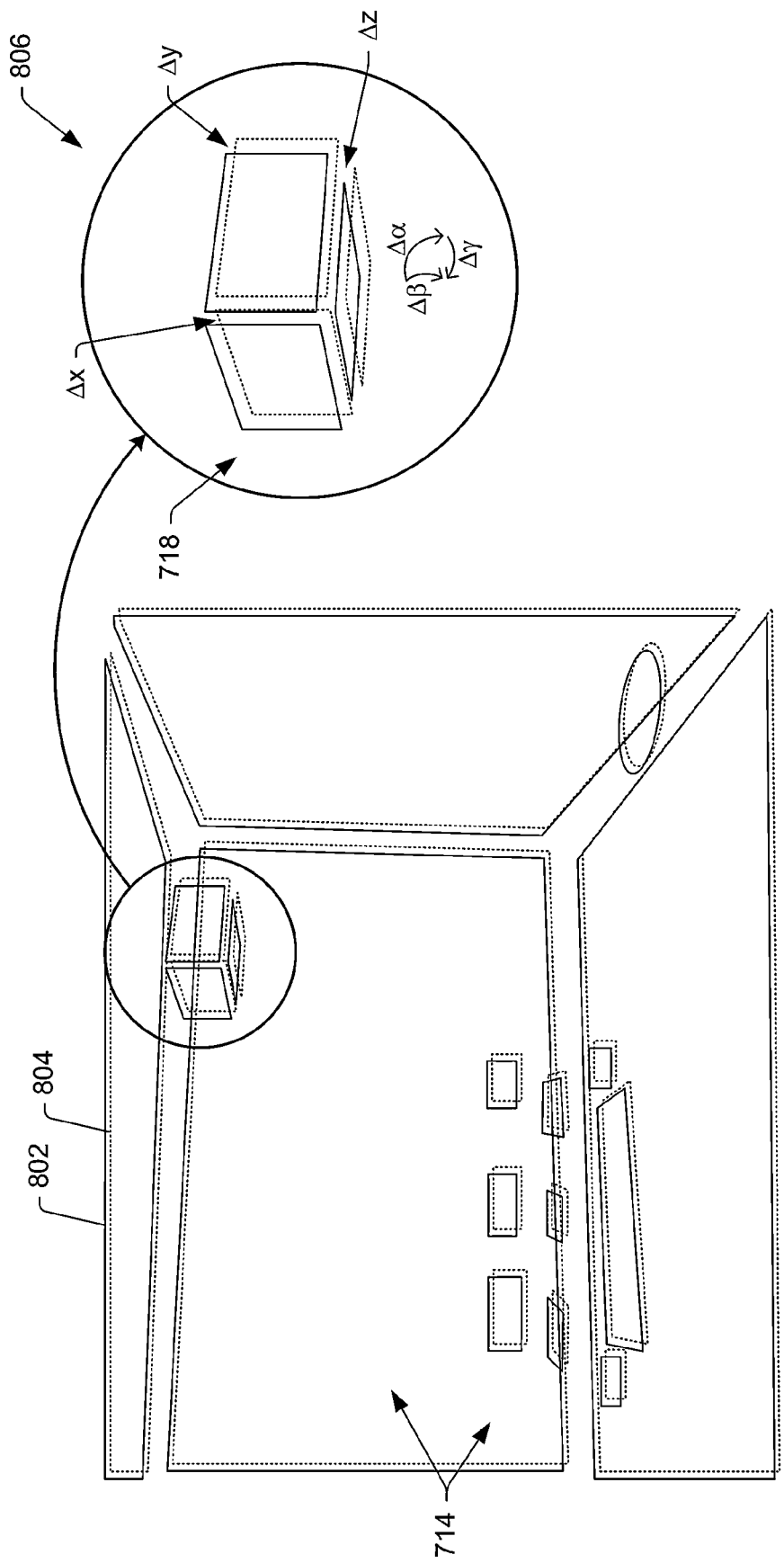
FIG. 8 shows a schematic diagram of the illustrative planar surfaces shown in FIG. 7 with illustrative planar surfaces from a subsequent image (frame) captured by the imaging device. The relationship between corresponding planar surfaces is used to determine the egomotion of the imaging device.

FIGS. 6-8 show examples of movement of the imaging device and corresponding movement of images detected by the imaging device. These figures are described with reference to the process 500 and show egomotion between a first frame (frame N) and a second frame (frame N+1).

FIG. 6 shows an isometric view of an ARFN 102 that moves from a first location 602 (depicted by solid lines) to a second location 604 (depicted by dotted lines). The movement (egomotion) causes a change in viewpoint of the imaging device, and thus a change in the perspective of an environment.

As shown in FIG. 6, an ARFN 102 may be implemented as part of a table lamp, although it may be incorporated into other familiar types of furniture. Further, the optical components described in this implementation may be embodied in a non-furniture arrangement, such as a standalone unit placed in the room or mounted to the ceiling or walls (i.e., similar to the ARFN 102(1) described above), or incorporated into fixtures such as a ceiling light fixture. The ARFN 102 has a head 606 attached to a base 608 by a movable arm mechanism 610. As illustrated, the arm mechanism 610 has two base members or rods 612 connected to two head members or rods 614 via a joint connector 616. Other configurations of the arm mechanism 610 may be used. In the illustrated implementation, the head 606 is connected to the arm mechanism 610 via a universal connector 618 that enables at least two degrees of freedom (e.g., along tilt and pan axes). In other implementations, the head 606 may be mounted to the arm mechanism 610 in a fixed manner, with no movement relative to the arm mechanism 610, or in a manner that enables more or less than two degrees of freedom. Thus, even when the ARFN 102 is located in ceiling or similar location, the head 606 may move in at least the two degrees of freedom. The head 606 may hold several components, including a projector and an imaging device (e.g., a camera, depth sensor, etc.).

As shown in FIG. 6, the head 606 may translate and rotate between the first frame and the second frame. For example, the head 606 may translate in a direction from a location $x_1$ to a location $x_2$, resulting in a translation of $\Delta x$ (e.g., $x_1-x_2=\Delta x$). The head 606 may also rotate from a first angle $\alpha_1$ to a second angle $\alpha_2$, resulting in a translation of $\Delta\alpha$ (e.g., $\alpha_1-\alpha_2=\Delta\alpha$). The translation may include translation along one or more of the x, y, and z axes while the rotation along one or more of three rotation axes $\alpha$, $\beta$, and $\gamma$. As shown with reference to FIG. 8, the viewpoint and resulting imagery captured by the imaging device changes after movement of the head 606, which includes the imaging device.

FIG. 7 shows illustrative images 700 of an environment from a perspective of the imaging device. One of the images 700 includes illustrative planar surfaces that may be identified within the environment via the operations 504 and 512 as described with reference to FIG. 5.

An initial image 702 may be a depth map, still image, or other type of image that includes information about objects in a room or other environment. The objects may include stationary objects or objects that are assumed to be stationary such as furniture 704, walls 706, a ceiling 708, a floor 710, tables 712, and other objects or features.

The spatial analysis module 132 may perform an analysis of the initial image to detect planar surfaces 714, which are depicted in an enhanced image 716. For example, the furniture 704, the walls 706, the ceiling 708, the floor 710, and/or tables 712 may be used to generate planar surfaces 714. In some embodiments, an object may be used to generate multiple of the planar surfaces 714, such as a lamp 718 that has multiple planar surfaces. In various embodiments, some of the planar surfaces 714 may be generated from objects that include curved portions. These planar surfaces may be portions or subsets of larger surfaces, such as cushions of a couch 720, portions of a curved table 722, and/or other types of objects. In accordance with some embodiments, the spatial analysis module 132 may generate planar surfaces even when a portion of the planar surface is obscured by another object. For example, the spatial analysis module 132 may generate a planar surface for an entire wall even though part of the wall may be obscured by furniture, people, wall hangings, and so forth.

FIG. 8 shows a schematic diagram of the planar surfaces 714 from an image shown in FIG. 7 and from a successive illustrative image (frame) captured by the imaging device. The relationship between corresponding planar surfaces (between the successive images) is used to determine the egomotion of the imaging device, as described herein. As shown in FIG. 8, the planar surfaces 714 are shown with solid lines in a first image 802 while the planar images 714 are shown with dotted lines in the second image 804, which is successive the first image 802.

For explanation purposes, a detail 806 of a portion of the planar surfaces for each image is provided in FIG. 8 and labeled with changes in transaction and rotation on an object (e.g., the lamp 718). The spatial analysis module 132 may determine the egomotion by analysis of the changes in the DOF between images and/or based on distortion and changes in the shapes of corresponding planar surfaces. In some embodiments, an iterative closest point (ICP) algorithm is used to find the egomotion of the imaging device between a frame N and a frame N+1 in a least squares sense.

FIG. 9 shows a flow diagram of an illustrative process 900 to identify moving objects within an environment using images captured by the imaging device while the imaging device moves within the environment. The process 900 is described with reference to FIG. 1; however, the process 900 may be implemented with any of the embodiments described herein.

At 902, the imaging device may capture depth maps of an environment, such as a room. However, the imaging device may also capture other imagery of the environment, such as still photographs, video, or other imagery.

At 904, the spatial analysis module 132 may determine egomotion of the imaging device based in part on an analysis of corresponding planar surfaces using the depth map from the operation 902. The spatial analysis module 132 may perform the operation using the process 400 and/or 500 as described above.

At 906, the spatial analysis module 132 may adjust a representation of the environment in a frame when comparing the frame to a successive (e.g., next) frame such that each frame in the comparison shows imagery from a same perspective (i.e., same location of the imaging device). Thus, the spatial analysis module 132 may be used to adjust an image to compensate for movement of the imaging device and thus recreate the image from a perspective of a previous location of the imaging device. Once the image is adjusted, the recreated image may be compared to the pervious image where the imaging device is in the previous location.

At 908, the tracking and control module 144 may compare the images, after the adjustment performed by the operation 906, to determine objects in the environment that are in motion, such as hands of a person. The tracking and control module 144 may analyze the motion to determine whether the motion is part of a gesture that is used by a person to interact with the ARFN 102. The tracking and control module 144 may also use the motion to track a surface for displaying a projection and/or for other purposes to operate an augmented reality system as described herein.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A computer-implemented method comprising:
   under control of one or more processors configured with executable instructions,
   creating, using information captured by a camera, depth maps of an environment, the depth maps including a first depth map at a first time and second depth map at a second time, the environment including objects;
   detecting planar surfaces of stationary objects in the first depth map and the second depth map using a random sampling and consensus algorithm, the stationary objects being a subset of the objects in the environment;
   associating at least a first planar surface from the first depth map to a second planar surface in the second depth map, the first planar surface being identified as corresponding to the second planar surface based at least in part on an estimated translation and rotation of the camera between the first time and the second time; and
   determining actual translation and rotation of the camera between the first time and the second time using iterative closest point analysis of locations of corresponding points that are located on the first planar surface and the second planar surface.

2. The method as recited in claim 1, further comprising selecting the stationary objects from the objects in the environment, and wherein the stationary objects include at least one wall or a floor.

3. The method as recited in claim 1, wherein the depth maps are created by measuring time of flight of light emitted by a light emitter and captured by the camera after the light is reflected by the objects in the environment.

4. The method as recited in claim 1, wherein the estimated translation and rotation of the camera is based at least in part on at least one of a previous translation and rotation of the camera or a control to cause the camera to translate and rotate between the first time and the second time.

5. The method as recited in claim 1, further comprising:
   creating an adjusted second depth map based at least in part on the translation and rotation of the camera, the adjusted second depth map depicting the objects at the second time as viewed from a previous imaging location of the camera, the previous imaging location used to create the first depth map, and
   comparing the adjusted second depth map to the first depth map to identify objects that have moved in the environment between the first time and the second time.

6. A method comprising:
   generating, using an imaging device, images of an environment at a first time to create a first frame and at a second time to create a second frame;
   detecting, via one or more processors, one or more reference features in the first frame and the second frame;
   associating a first instance of a reference feature from the first frame to a second instance of the reference feature in the second frame as corresponding to a same reference feature, wherein the first instance and the second instance of the reference feature are determined based at least in part on a predicted movement of the imaging device between the first frame and the second frame;
   determining at least one of translation or rotation of the imaging device between the first time and the second time based at least in part on locations of corresponding points that are located on the first instance of the reference feature at the first time and the second instance of the reference feature at the second time.

7. The method as recited in claim 6, wherein the predicted movement is obtained by at least one of tracking movement of motors that move the imaging device, using a previous comparison of corresponding reference features, or analyzing sensor feedback indicative of movement of the imaging device.

8. The method as recited in claim 6, wherein the reference feature is selected from at least one of a planar surface, an edge, or a known shape of a stationary object in the environment.

9. The method as recited in claim 6, wherein the second frame is a successive frame subsequent in time to the first frame.

10. The method as recited in claim 6, wherein the detecting the reference features is performed using a RANdom Sampling and Consensus (RANSAC) algorithm that identifies at least one of straight lines from edges of an object in the environment or planar surfaces from a portion of the object.

11. The method as recited in claim 6, wherein the determining at least one of translation or rotation of the imaging device is performed using iterative closest point (ICP) analysis of the locations of the corresponding points that are located on the first instance of the reference feature at the first time and the second instance of the reference feature at the second time.

12. The method as recited in claim 6, wherein the associating the first instance of the reference feature from the first frame to the second instance of the reference feature is initiated in response to at least one of powering on a system, executing a command to move the imaging device, or detecting a movement of the imaging device.

13. The method as recited in claim 6, further comprising storing in computer memory the at least one of the translation or rotation in association with at least the first frame or the second frame.

14. The method as recited in claim 6, wherein the reference feature is from an object that is at least partially obscured by another object.

15. The method as recited in claim 6, further comprising:
   modifying a frame based at least in part on the at least one of translation or rotation of the imaging device to recreate the frame, the recreated frame depicting the objects at a different time as viewed from an imaging location used to create another frame at the different time;

comparing the recreated frame to the other frame to identify objects that move in the environment; and tracking movement of at least one of surfaces that receive projected imagery or objects that are used as inputs to cause user interaction with the environment.

16. A system comprising:

a projector to project light onto objects in an environment;

an imaging device to capture images of the objects in the environment; and one or more processors to execute instructions to:

detect reference features of the captured images, the reference features being at least one of planar surfaces or edges of at least a portion the objects in the environment;

associate at least a first reference feature from a frame to a second, corresponding, reference feature in a successive frame, the first reference feature and the second reference feature associated based at least in part on a predicted movement of the imaging device between the frame and the successive frame; and determine at least one of translation or rotation of the imaging device between the frame and the successive frame based at least in part on information associated with the first reference feature and the second reference feature.

17. The system as recited in claim 16, further comprising memory to store the at least one of translation or rotation of the imaging device in association with at least one of the frame or the successive frame.

18. The system as recited in claim 16, wherein the processors further execute instructions to generate planar equations for the first reference feature and the second reference feature, and wherein the determination of the at least one of translation or rotation of the imaging device is based at least in part on a comparison of planar equations of the first reference feature and the second reference feature.

19. The system as recited in claim 16, wherein the objects used in the detection of the planar surfaces or the edges are stationary objects, and wherein the one or more processors execute instructions to identify the stationary objects within the environment.

20. The system as recited in claim 16, wherein the captured images are at least one of depth maps or still images of the environment that includes the objects.

21. The system as recited in claim 16, wherein the first reference feature and the second reference feature are associated with at least one of a wall, floor, or furniture of a room.

22. One or more non-transitory computer-readable media storing computer-executable instructions that, when executed on one or more processors, performs acts comprising:

generating, via an imaging device, images of an environment to create at least a first frame and a second frame;

detecting, via one or more processors, reference features in the first frame and the second frame;

associating a first reference feature from the first frame to a second, corresponding reference feature in the second frame, the first reference feature and the second reference feature associated based at least in part on a predicted movement of the imaging device between the frame and the successive frame; and analyzing information associated with the first reference feature and the second reference feature to determine at least one of translation or rotation of the imaging device between the first frame and the second frame.

23. The one or more non-transitory computer-readable media as recited in claim 22, wherein the reference features are selected from at least one of planar surfaces, edges, or known shapes of stationary objects in the environment.

24. The one or more non-transitory computer-readable media as recited in claim 22, wherein the detecting the reference features is performed using a RANdom Sampling and Consensus (RANSAC) algorithm that identifies at least one of straight lines from edges of an object in the environment or planar surfaces from a portion of the object.

25. The one or more non-transitory computer-readable media as recited in claim 22, wherein determining at least one of translation or rotation of the imaging device is performed using iterative closest point (ICP) analysis of the locations of corresponding points that are located on the first reference feature and the second reference feature.

\* \* \* \* \*